United States Patent [19]

Storz

[11] Patent Number: 4,564,094
[45] Date of Patent: Jan. 14, 1986

[54] FLUID FRICTION CLUTCH

[75] Inventor: Werner Storz, Benningen, Fed. Rep. of Germany

[73] Assignee: Sueddeutsche Kuehlerfabrik Julius Fr. Behr GmbH & Co. KG, Fed. Rep. of Germany

[21] Appl. No.: 440,946

[22] Filed: Nov. 12, 1982

[30] Foreign Application Priority Data

Dec. 3, 1981 [DE] Fed. Rep. of Germany ....... 3147797

[51] Int. Cl.$^4$ ...................... F16D 35/00; F16D 43/25
[52] U.S. Cl. .................................. 192/58 B; 192/82 T
[58] Field of Search ........................ 192/58 B, 82 T; 137/112

[56] References Cited

U.S. PATENT DOCUMENTS

| 3,268,041 | 8/1966 | Roper | 192/58 B |
| 4,086,988 | 5/1978 | Spence | 192/58 B |
| 4,086,989 | 5/1978 | Spence | 192/58 B |
| 4,133,417 | 1/1979 | Glasson et al. | 192/58 B |
| 4,278,158 | 7/1981 | Martin | 192/58 B |

FOREIGN PATENT DOCUMENTS

| 1256018 | 12/1971 | United Kingdom . |
| 1546997 | 6/1979 | United Kingdom . |
| 2087047 | 5/1982 | United Kingdom . |

Primary Examiner—Rodney H. Bonck
Attorney, Agent, or Firm—Barnes & Thornburg

[57] ABSTRACT

The invention provides a baffle arrangement for increasing the return flow pressure for clutch fluid in a fluid friction clutch of the type having a rotatable driving disk disposed to rotate in a work space of a relatively rotatable housing. The work space is separated by an intermediate disk fixed to the housing and clutch fluid return bore means are provided at the periphery of the intermediate disk. In order to prevent wearing of the baffle member and also to accommodate fixation of the baffle member in a minimum thickness clutch construction, the baffle member is supported at the intermediate disk in an oblong hole adjacent to the circumference thereof. The baffle member is guided for movement between respective circumferential end positions in the oblong hole, is axially fixed by a retaining washer or the like to the intermediate disk, and is guided so as to be radially immovable.

18 Claims, 8 Drawing Figures

FLUID FRICTION CLUTCH

BACKGROUND AND SUMMARY OF THE INVENTION

The invention relates to a fluid friction clutch with a primary part which includes a driving disk, and a secondary part which includes a housing. The primary and secondary parts are rotatably supported for rotation with respect to one another and the driving disk is arranged to rotate in a working space in the housing. By means of an intermediate disk secured to the housing, the working space is separated from a fluid storage space formed in the housing. At least one outlet or return bore is provided at the outer circumference of the intermediate disk for connecting the working space with the storage space. The viscous clutch fluid is guided from the working space to the storage space through the return bore or bores. A baffle member, which takes an end position in dependence upon the driving direction of the driving disk, serves to damm-up the clutch fluid in front of the return bore or bores to increase the return pressure.

By way of background information as to the type of clutch the invention relates to, see commonly assigned U.S. Pat. No. 4,278,158 to Martin.

With fluid friction clutches there is a problem to return pump the clutch fluid which flows from the storage space to the work space, back into the storage space. The return guidance normally occurs over channels which extend from the radial outer region of the working space to the storage chamber or space. In order to guide the clutch fluid, which because of the centrifugal force extends in these outer radial regions of the working space, with sufficient pressure to the return bores, it has been contemplated to damm-up the fluid in the region of the return bores with the help of baffle members. For example, see the above noted U.S. Pat. No. 4,278,158. With a known construction a roller is arranged radially outwardly of the driving disk between the same and the housing, which roller is shovable or moveable in the circumferential direction between two protrusions provided on the housing. In dependence on the rotational direction of the driving disk, the roller automatically takes one of two possible end positions in which it serves to damm-up the clutch fluid in front of the return bores. A disadvantage of this arrangement is that the roller is in direct friction contact with the driving disk, the housing wall and the housing protrusions, whereby wearing occurs. This results in that the amount of the clutch fluid which is pumped out for a given rotational speed decreases over time so that the control characteristics of the clutch are changed. Therefore new rollers must be inserted at certain intervals, requiring the disassembly of the clutch, and consequent expenditure of time and money.

According to another contemplated construction (Viskokupplung Saab Scania T 20 mul/edul), an annular groove is provided in the driving disk, in which a floating baffle member is disposed. The baffle member is moveable within limits in the circumferential direction of the driving disk, whereby the respective end position of the baffle member is established by means of limits stops arranged on the intermediate disk. The return bores extending in the axial direction of the intermediate disk are so arranged that they are respectively opened when the baffle member reaches one of its end positions. By this known construction, friction contact between the driving disk and the baffle member can occur because the baffle member can come into contact with the driving disk. However, the baffle member is stopped on the stop pins or protrusion in the circumferential direction. It is however disadvantageous with such a construction in that the driving disk must have a relatively large axial width in order to accommodate a baffle member of a correspondingly large axial width and reliably guide the same therein. This is contrary to the general present day tendancy to construct fluid friction clutches, especially for passenger automobiles, with as small a construction thickness as possible. Furthermore, the construction and material expenses for such driving disks are relatively large.

The invention is based upon the problem of avoiding the above-mentioned disadvantages and providing for the attachment of a baffle member for a fluid friction clutch, which is independent of the driving or intermediate disk thickness, so that the attachment of same with very thin driving and intermediate disks is possible, whereby the entire construction depth or thickness of the fluid friction clutch is minimized and furthermore constant clutch operating characteristics are guaranteed.

The invention contemplates the provision of a circumferentially extending guide at the intermediate disk for guidance of the baffle member to have limited movement in the circumferential direction and no movement in the radial direction. Such a guidance, which is preferably in the form of an oblong hole, can be simply and economically constructed independently of the axial depth of the intermediate disk. Thus the invention is especially advantageous if the fluid friction clutch should only utilize a very small construction depth or thickness. Therefore, because the baffle member is guided in the oblong hole, it is assured that its position is fixed in the radial direction and it does not rub or slide on the driving disk. A similar operation over a long period of time is therefore assured because no mechanical rubbing and therefore no wearing of the baffle member occurs.

In advantageous embodiments of the invention, it is contemplated that the baffle member is provided with a guidance pedestal which protrudes through the oblong hole of the intermediate disk into the storage space and that the baffle member is secured to the intermediate disk by means of an axial securement of the protruding pedestal part at the storage space side surface of the intermediate disk. By these means the baffle member is positioned in the axial and the radial direction so that it is moveable only in the circumferential direction to its two end positions in dependance on the relative turning direction of the driving disk and the housing. This arrangement has the advantage that the bearing support of the baffle member is basically unchanged for the two rotational directions, thus increasing the reliability of the regulation of the clutch. For the axial securement of the baffle member a retaining washer is used, which exhibits a cut-out and can be clamped over the protruding part of the guidance pedestal. One can also use snap rings (splined) or other known fastener elements according to other preferred embodiments of the invention.

According to a particularly advantageous embodiment of the invention, it is provided that two return bores are provided in the intermediate disk at the same radial distance from the center of the intermediate disk and separated from one another in the circumferential direction by means of a bridging part extending approximately one-twentieth (1/20) of the intermediate disk circumference. The baffle member exhibits a length in the circumferential direction corresponding to the distance between the centers of the return bores, and the radial height of the baffle member and the sliding movement thereof is so dimensioned that, in the respective end positions, one of the return bores and the oblong hole are closed by the baffle member. A particularly simple construction is provided when the oblong bore extends between the two return bores in the intermediate disk. With this arrangement the entire radial height of the baffle member can be minimized so that the baffle member can be constructed with a minimum of material.

According to especially preferred embodiments of the invention the circumferential ends of the baffle member (fluid damming surfaces) are beveled to increase their damming efficiency.

According to another preferred embodiment a return bore is formed through the intermediate disk and the oblong guidance hole is provided at a radial distance from the return bore. The baffle member exhibits a protruding part with which the clutch fluid is dammed and a part which covers the oblong hole in all possible positions of the baffle member. This embodiment offers the advantage that only one return bore must be formed in the intermediate disk, however the radial extension of the stop body must be greater than with the embodiment with two return bores because the oblong hole must be radially offset with respect to the return bore.

Yet another preferred embodiment is contemplated which utilizes the circumferential end regions of the oblong hole as the respective return bores, wherein the baffle member exhibits a correspondingly smaller length than the oblong hole, so that in respective ones of the baffle member end positions, there is a free region of the oblong hole through which the clutch fluid is guided to the storage space.

In all embodiments, the end regions of the baffle member may be provided with cut-outs to improve the guidance of the clutch fluid to the return bores.

The baffle members are preferably formed out of injection molded plastic, whereby they are very economically constructed. This is especially possible with the arrangements of the present invention because the baffle members will not experience any mechanical friction or rubbing and therefore they need not be especially stably constructed.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
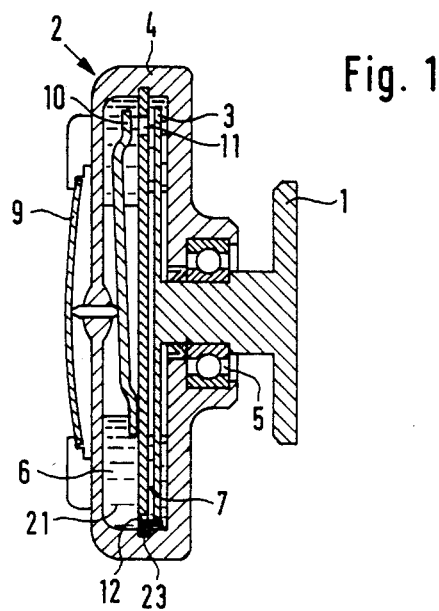
FIG. 1 is a schematic sectional view illustrating a friction fluid coupling of the type contemplated for use with the present invention.

FIG. 1 schematically illustrates a fluid friction clutch of the type which the present invention is concerned with. Primary part 1 is rotatably supported with respect to secondary part 2 by means of bearing 5. Driving disk 3 forms part of primary part 1 and rotates within working space 7 inside of housing 4, which housing 4 is formed by secondary part 2. The working space 7 is separated from a storage chamber or space 6 by means of an intermediate or separating disk 8, so that the storage space 6 forms a reservoir for the viscous clutch fluid 21. Inlet opening 11 in intermediate disk 8 leads from the storage or reservoir space 6 to the working space 7. By means of temperature responsive bimetallic member 9 and valve member 10, the opening 11 is controlled to regulate the volume of fluid supplied in dependance on the temperature. When the primary part 1 is driven, the rotational movement is transferred to the secondary part 2 by means of the friction of the running clutch fluid in the working space and the adhesion on the walls of the secondary part 2. With higher ambient temperatures (temperature of the area, when the clutch is used for controlling the driving of a cooling fan in an automobile, for example) the inlet opening 11 is completely opened with the result that the full turning moment is transferred. The clutch is then fully coupled. With a lowering of the temperature, the opening 11 is correspondingly closed by the valving member 10, whereby the through flow of the fluid into the working space will eventually become fully blocked. In order to guide the fluid 21 from the working space 7 back to the storage space 6, a return bore 12 is provided, which, with the help of a baffle member, accommodates the pumping of the clutch fluid out of the work space into the storage space.

Figure 2:
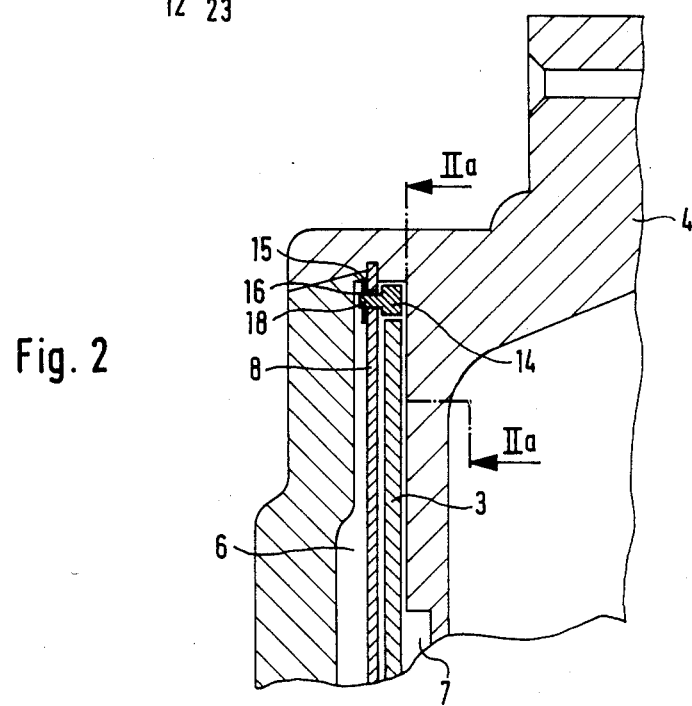
FIG. 2 is a part sectional schematic view showing a first embodiment of a friction fluid clutch and baffle member arrangement constructed in accordance with the present invention.
Figure 2A:
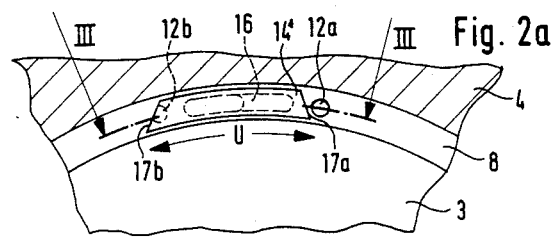
FIG. 2A is a sectional view along the line IIa—IIa of FIG. 2.
Figure 3:
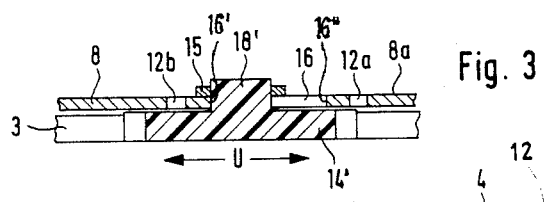
FIG. 3 is a sectional view through the intermediate disk of FIG. 2A, taken along the line III—III.

FIG. 2 illustrate the inventive arrangement of a baffle member 14 guided in oblong hole 16 at the outer circumferential region of the intermediate disk 8. (A corresponding oblong hole 16 is also shown in FIGS. 2a and 3.) The baffle member 14 is provided with a guidance base or pedestal 18 protruding through the oblong hole 16. A part of the base 18 protrudes beyond the storage space side surface of the separating disk 8. On this protruding part, there is an axial securement device 15 which is formed as a snap ring or the like so that the baffle member is prevented from movement in the axial direction (parallel to the common axis of the intermediate disk and driving disk). This form of the attachment of the baffle member is practically independent of the axial depth or thickness of the intermediate disk 8 so that this thickness can be very small, whereby the construction depth of the clutch can be minimized. Because the baffle member 14 is radially fixed, it is assured that there is no direct friction contact between the baffle member 14 and the outer circumferential region of the driving disk 3, so that the baffle member does not become worn and can serve for a long period of time as a reliable constant control member.

According to the embodiment illustrated in FIGS. 2a and 3, two return bores 12a and 12b are provided in the intermediate disk 8', which bores are at the same radial distance from the center of the disk 8' and are spaced from one another by a bridging part of the circumference of the disk which extends approximately one twentieth (1/20) of the circumference of disk 8'. The baffle member 14' exhibits a length which corresponds to the distance between the return bores 12a and 12b and is beveled at the stop or damming surfaces 17a and 17b. In the circumferential direction U the baffle member 14' is shovable (moveable), between limits, and is moveable so far until its guidance pedestal 18' comes to one of the two ends of the oblong opening 16 against abutment edges 16' or 16''. In these two end positions, which are automatically engaged by the baffle member 14' in dependance upon the rotational direction of the driving disk 3 (as a result of the clutch fluid adhesion and pressure forces acting on the stop surfaces of the baffle member), the baffle member 14' closes either the return bore 12a or the return bore 12b and opens the corresponding other bore so that the clutch fluid can flow through the open bore (in FIG. 2a, this is the bore 12a). The illustrated position for the baffle member 14' is then assumed if the driving disk 3 is rotated in the counter-clockwise direction.

Figure 4:
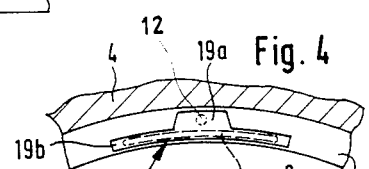
FIG. 4 is a view similar to FIG. 2A, but showing a second preferred embodiment of the baffle member arrangement of the present invention.

In FIG. 4 another embodiment of a baffle member 19 is shown which is formed with section 19b and a shoulder 19a. The shoulder 19a takes over the fluid damming or stop function. This embodiment is provided with a return bore 12 oppositely disposed with respect to the baffle member 19, which baffle member 19 is so pushed in dependance on the turning direction of the driving disk 3, that respectively one of the two damming surfaces on the shoulder 19a are disposed in the region of the return bore 12. With this embodiment, the oblong hole 16 is radially disposed with respect to the return bore 12 in the separating disk 8'', and is always covered by the baffle member 19, in all positions thereof. This embodiment has the advantage that only a single return bore needs to be provided in the intermediate disk, however this arrangement makes it necessary to have a greater overall radial height of the baffle members, as compared to FIG. 2a illustrated baffle member.

Figure 5:
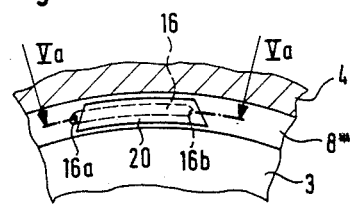
FIG. 5 is a view similar to FIGS. 2A and 4 showing a further embodiment of a baffle member arrangement constructed in accordance with the present invention.
Figure 5A:
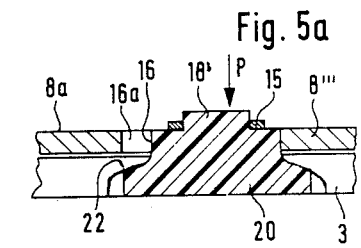
FIG. 5A is a sectional view along the line Va—Va of FIG. 5.
Figure 5B:
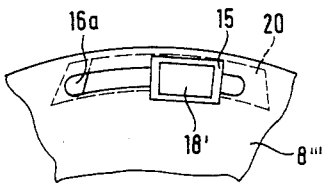
FIG. 5B is a view in the direction of arrow P of FIG. 5A.

A further embodiment is shown in FIGS. 5, 5a, and 5b, wherein the end sections 16a and 16b of an oblong hole serve as fluid return bores. The baffle member 20 is on the other hand guided in the oblong hole only in the circumferential direction where it is movable within limits, the dimensions of the baffle member 20 being however so arranged with respect to the oblong bore that respectively in one of the two end positions one of the end regions 16a or 16b is accessible for the clutch fluid. On the part of the guidance base which protrudes beyond the storage space side surface 8a of the intermediate disk 8''', is a retaining washer 15 pressed over the guiding pedestal 18' to axially secure same, so that the position of the baffle member 20 is axially secured. To better guide and divert the clutch fluid, the baffle member 20 is provided with corresponding cutouts 22 (FIG. 5a) which function for a good guidance of the clutch fluid into the end regions 16a, 16b, serving as return bores. This type or a similar construction of cutouts can actually be provided for all of the baffle member embodiments of the invention.

FIG. 5b, which is a view in the direction of arrow P of FIG. 5a, shows the axial securement through the retaining washer 15 which is provided with a larger radial dimension than the oblong hole and thereby prevents the baffle member from being shoved in the axial direction parallel to the disk axis of rotation.

For all shown embodiments the baffle member is held in an oblong hole of the intermediate disk so as not to be radially movable, so that a mechanical friction contact between the driving disk 3 and the associated surface of the baffle member is prevented. In the intermediate disk there must only be provided the oblong hole and one or two return bores. The oblong hole serves for the locating of the baffle member fluid damming body, substantially independently of the thickness of the intermediate disk. Thus, the invention can be used with relatively thin intermediate disks, and corresponding clutches with small construction depth or thickness.

While I have shown and described several embodiments in accordance with the present invention, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:
1. A fluid friction clutch comprising:
a primary part having a driving disk,
a secondary part defining a housing, bearing means rotatably supporting said primary and secondary part for relative rotation,
an intermediate disk means separating said housing into a working space and a clutch fluid storage space,
said driving disk being disposed in said working space,
return bore means for accommodating return of clutch fluid from the working space to the storage space, and
baffle means for damming-up the fluid adjacent the return bore means to increase the return flow pressure of the fluid,
wherein said baffle means is supported at a guide in the intermediate disk means to be movable within limits in the circumferential direction while being fixed in the radial direction,
wherein said intermediate disk means is fixed to said housing,
wherein the guide is formed as an elongated circumferentially extended oblong hole through said intermediate disk means, and
wherein the baffle means is provided with a guidance part which protrudes through the oblong hole and extends beyond the surface of the intermediate disk means in the direction of the storage space, and wherein the baffle means is axially secured to the intermediate disk means by gripping means at the storage space side of the intermediate disk means.

2. Clutch according to claim 3, wherein circumferential ends of the baffle means which form fluid contacting damming means are beveled.

3. Clutch according to claim 1, wherein the baffle means is provided with recesses for guidance of the clutch fluid to the return bores.

4. Clutch according to claim 1, wherein the baffle means is an injection molded plastic member.

5. A fluid friction clutch, comprising:
a primary part having a driving disk,
a secondary part defining a housing, bearing means rotatably supporting said primary and secondary part for relative rotation,
an intermediate disk means separating said housing into a working space and a clutch fluid storage space,
said driving disk being disposed in said working space,
return bore means for accommodating return of clutch fluid from the working space to the storage space, and
baffle means for damming-up the fluid adjacent the return bore means to increase the return flow pressure of the fluid,
wherein said baffle means is supported at a guide in the intermediate disk means to be movable within limits in the circumferential direction while being fixed in the radial direction,
wherein said intermediate disk means is fixed to said housing,
wherein the guide is formed as an elongated circumferentially extended oblong hole through said intermediate disk means, and
wherein the return bore means includes two return bores through said intermediate disk means at the same radial distance from the center of the intermediate disk means and separated from one another in the circumferential direction by a bridging part of the intermediate disk means, wherein the baffle means is a member having a length corresponding to the distance between the return bore centers, and wherein the radial height of the baffle means and the sliding path of the baffle means along the oblong hole are so dimensioned that the oblong hole and one of the respective return bores are closed when said baffle means is pushed into respective end positions by the fluid acting thereon during relative rotation of the primary and secondary parts.

6. Clutch according to claim 5, wherein the oblong hole is formed in between the two return bores.

7. Clutch according to claim 5, wherien the bridging part extends circumferentially approximately one-twentieth (1/20th) of the circumference of the intermediate disk means.

8. Clutch according to claim 5, wherein the baffle means is provided with recesses for guidance of the clutch fluid to the return bores.

9. Clutch according to claim 5, wherein the baffle means is an injection molded plastic member.

10. A fluid friction clutch, comprising:
a primary part having a driving disk,
a secondary part defining a housing, bearing means rotatably supporting said primary and secondary part for relative rotation,
an intermediate disk means separating said housing into a working space and a clutch fluid storage space,
said driving disk being disposed in said working space,
return bore means for accommodating return of clutch fluid from the working space to the storage space, and
baffle means for damming-up the fluid adjacent the return bore means to increase the return flow pressure of the fluid,
wherein said baffle means is supported at a guide in the intermediate disk means to be movable within limits in the circumferential direction while being fixed in the radial direction,
wherein said intermediate disk means is fixed to said housing,
wherein the guide is formed as an elongated circumferentially extended oblong hole through said intermediate disk means, and wherein said return bore means includes a return bore through the intermediate disk means, wherein the oblong hole is spaced in the radial direction from the return bore, and wherein the baffle means includes a shoulder for damming the fluid and a base part which covers the oblong hole in all positions of the baffle means.

11. Clutch according to claim 10, wherein the baffle means is provided with recesses for guidance of the clutch fluid to the return bores.

12. Clutch according to claim 10, wherein the baffle means is an injection molded plastic member.

13. A fluid friction clutch, comprising:
a primary part having a driving disk,
a secndary part defining a housing, bearing means rotatably supporting said primary and secondary part for relative rotation,
an intermediate disk means separating said housing into a working space and a clutch fluid storage space,
said driving disk being disposed in said working space,
return bore means for accommodating return of clutch fluid from the working space to the storage space, and
baffle means for damming-up the fluid adjacent the return bore means to increase the return flow pressure of the fluid,
wherein said baffle means is supported at a guide in the intermediate disk means to be movable within limits in the circumferential direction while being fixed in the radial direction,
wherein said intermediate disk means is fixed to said housing,
wherein the guide is formed as an elongated circumferentially extended oblong hole through said intermediate disk means,
wherein said return bore means are the respective circumferential end portions of the oblong hole, and wherein the baffle means is configured to selectively block one of the return bore end portions and open the other in dependence on the respective end position of the baffle means.

14. Clutch according to claim 13, wherein the baffle means is provided with recesses for guidance of the clutch fluid to the return bores.

15. Clutch according to claim 13, wherein the baffle means is an injection molded plastic member.

16. A fluid friction clutch, comprising:
a primary part having a driving disk,
a secondary part defining a housing, bearing means rotatably supporting said primary and secondary part for relative rotation,
an intermediate disk means separating said housing into a working space and a clutch fluid storage space, said driving disk being disposed in said working space,
return bore means for accommodating return of clutch fluid from the working space to the storage space, and
baffle means for damming-up the fluid adjacent the return bore means to increase the return flow pressure of the fluid,
wherein said baffle means is supported at a guide in the intermediate disk means to be movable within limits in the circumferential direction while being fixed in the radial direction,
wherein said intermediate disk means is fixed to said housing, and wherein the guide is formed as an elongated circumferentially extended oblong hole through said intermediate disk means, and wherein circumferential ends of the baffle means which form fluid contacting damming means are beveled.

17. Clutch according to claim 12, wherein the baffle means is provided with recesses for guidance of the clutch fluid to the return bores.

18. Clutch according to claim 8, wherein the baffle means is an injection molded plastic member.

* * * * *